Aug. 18, 1942.  A. H. COHEN  2,293,195
CAMERA
Filed Sept. 23, 1939  5 Sheets-Sheet 1

INVENTOR
ALVIN H. COHEN
BY
Gluck & Breitenfeld
ATTORNEYS

Aug. 18, 1942.　　　　A. H. COHEN　　　　2,293,195
CAMERA
Filed Sept. 23, 1939　　　　5 Sheets-Sheet 2
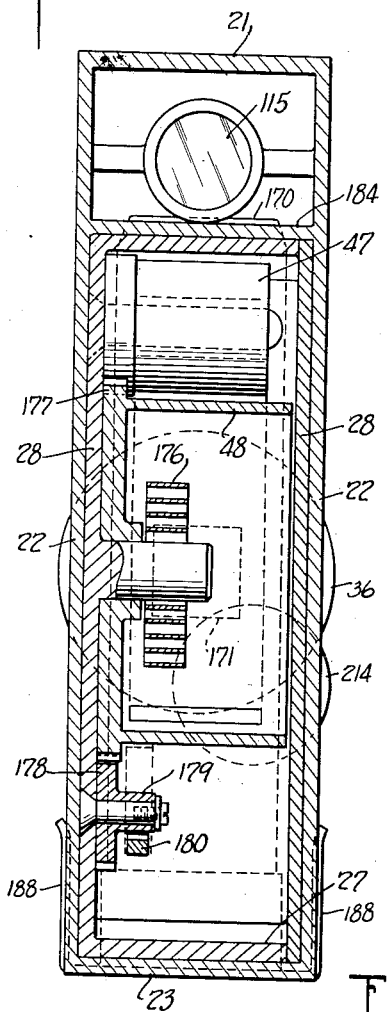
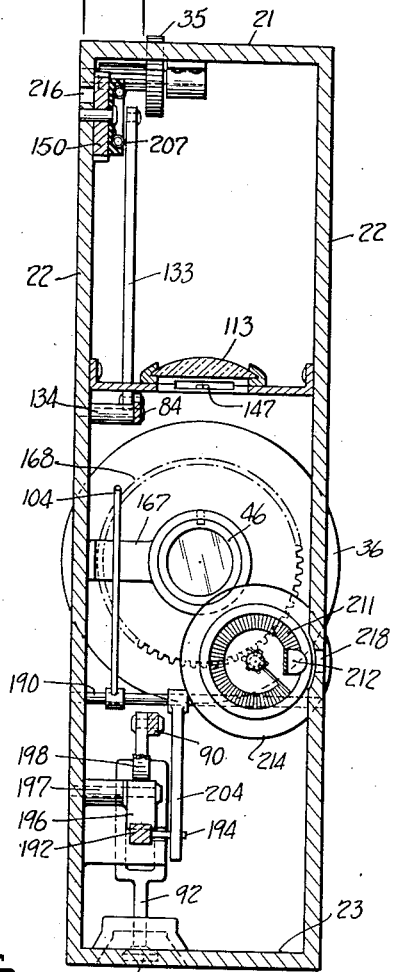
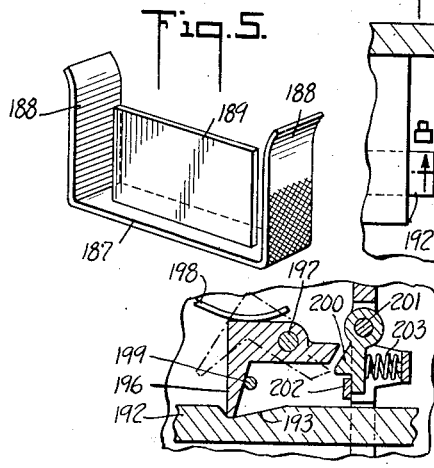
INVENTOR
ALVIN H. COHEN
BY
Gluck & Breitenfeld
ATTORNEYS

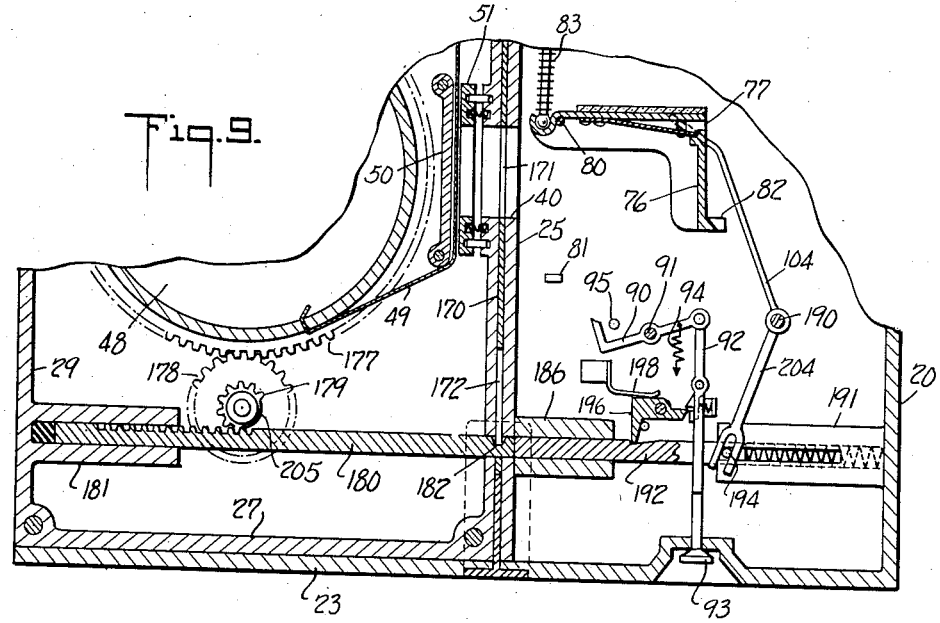
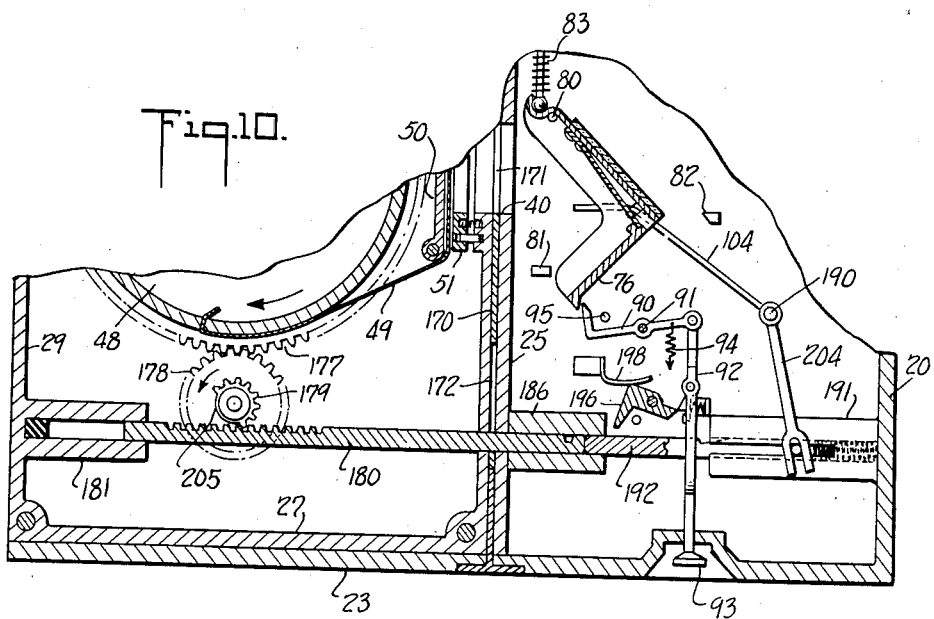

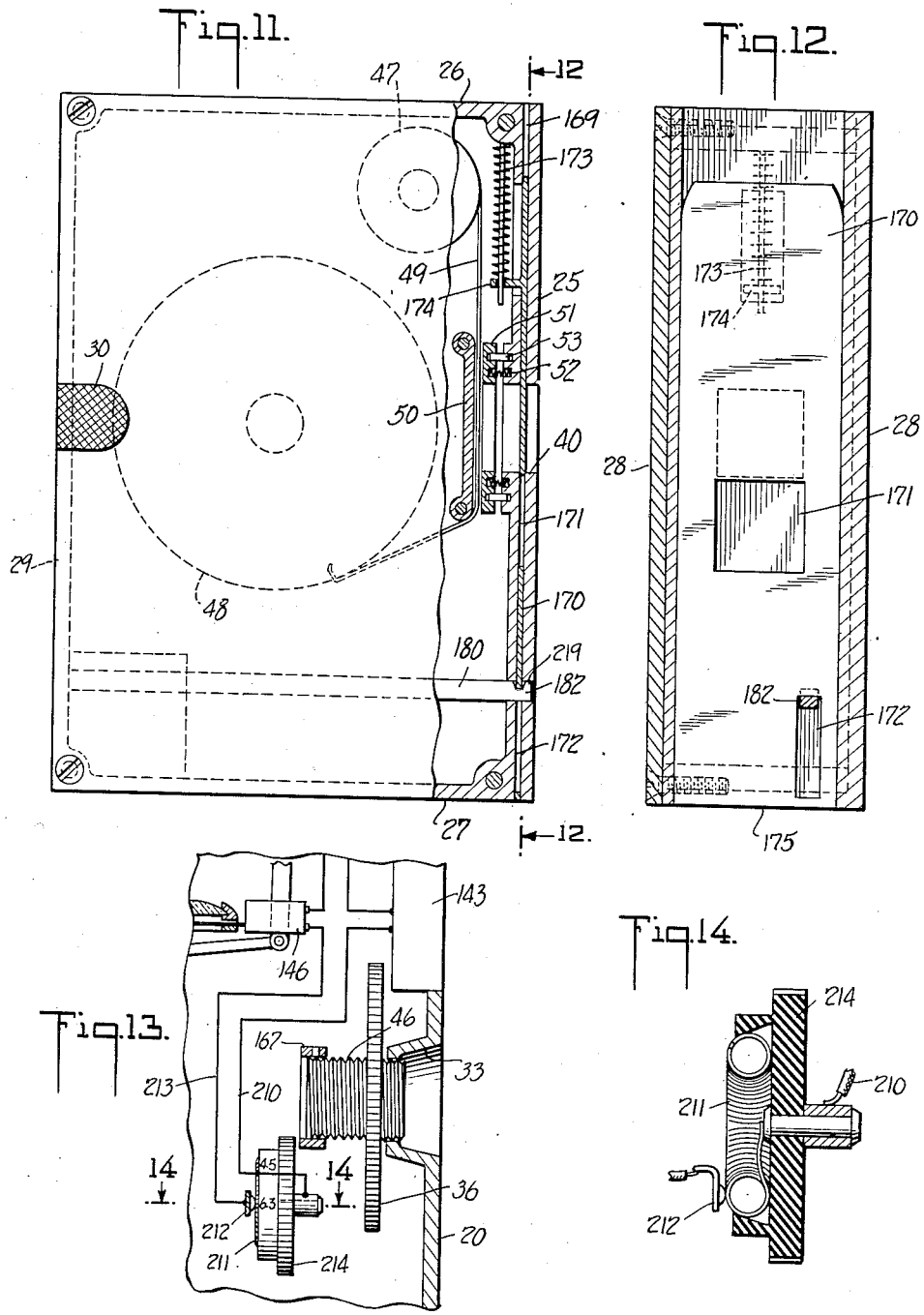

Aug. 18, 1942.　　　　A. H. COHEN　　　　2,293,195
CAMERA
Filed Sept. 23, 1939　　　　5 Sheets-Sheet 5

INVENTOR
ALVIN H. COHEN
BY
Gluck & Breitenfeld
ATTORNEYS

Patented Aug. 18, 1942

2,293,195

UNITED STATES PATENT OFFICE 2,293,195

CAMERA

Alvin H. Cohen, New York, N. Y., assignor of one-half to Frederick L. Katz, New York, N. Y.

Application September 23, 1939, Serial No. 296,210

11 Claims. (Cl. 95—34)

My present invention relates generally to cameras, and has particular reference to certain improvements in a camera of the kind which is illustrated and described in my copending patent application Serial No. 282,332.

The general objects are substantially the same as those set forth in said pending application. I aim to provide a camera whose operation is greatly simplified, and which functions reliably and uniformly at maximum efficiency. The structure is of such a character that there is a definite automatic correlation between the intensity and quality of the light that enters the camera, the actinic sensitivity of the film, and the effective shutter speed.

The present improvements are primarily intended to further simplify the mode of use of the camera, and to widen its range of utility.

One of the present improvements provides for automatic film advancement, thus further simplifying the mode of operation. In accomplishing this object, I am also enabled to make certain improvements in the film magazine or cassette, whereby it constitutes a complete self-contained light-tight unit capable of independent handling. In accordance with the present invention, this unit is adapted to be removably inserted into the camera body with a minimum of effort, and adapted to be properly positioned and rendered operative by a simple exteriorly controllable means.

It is a feature of the present invention to provide a film cassette which comprises, within itself, a feeding reel, a take-up reel, and a motor urging the film from one reel to the other. Means are provided for restraining the motor at all times except when film advancement is called for.

Another of the present improvements relates to the correlation between the intensity and quality of the light that enters the camera, and the actinic sensitivity of the film, on the one hand, and the effective shutter speed and lens aperture, on the other hand.

In my aforementioned pending patent application, I have pointed out the desirability of employing an objective lens of fixed aperture, specifically corrected for the zonal aberrations corresponding to that aperture. It may under certain circumstances be desirable to replace such a lens, in its entirety, by another lens of different fixed aperture, similarly specifically corrected. The present invention provides for such a contingency.

Also, notwithstanding the desirability of using a lens of fixed aperture, it may be desirable, under certain circumstances, to employ a lens of variable aperture, and the present improvements relate, in part, to a means for permitting the use of such a lens.

I achieve the foregoing objects and such other objects as may hereinafter appear or be pointed out, in the manner illustratively exemplified in the accompanying drawings, wherein—

Figure 3 is a cross-sectional view taken substantially along the line 3—3 of Figure 1;

Figure 4 is a cross-sectional view taken substantially along the line 4—4 of Figure 1;

Figure 5 is a perspective view of the device for locking the film cassette in position;

Figure 6 is an enlarged fragmentary cross-sectional view taken substantially along the line 6—6 of Figure 1;

Figure 7 is a fragmentary cross-sectional view taken substantially along the line 7—7 of Figure 6;

Figure 8 is a fragmentary cross-sectional view taken substantially along the line 8—8 of Figure 6;

Figure 9 is a fragmentary cross-sectional view of the lower portion of Figure 1 showing the parts in position immediately after the shutter has been released;

Figure 10 is a view similar to Figure 9 showing the parts in position after the shutter has been restored and after the automatic film advancement;

Figure 11 is a side elevation, partly in section, of the film cassette by itself;

Figure 12 is a cross-sectional view taken substantially along the line 12—12 of Figure 11;

Figure 13 is a view similar to the right hand portion of Figure 1 showing a modification;

Figure 14 is an enlarged cross-sectional view taken substantially along the line 14—14 of Figure 13;

Figure 1:
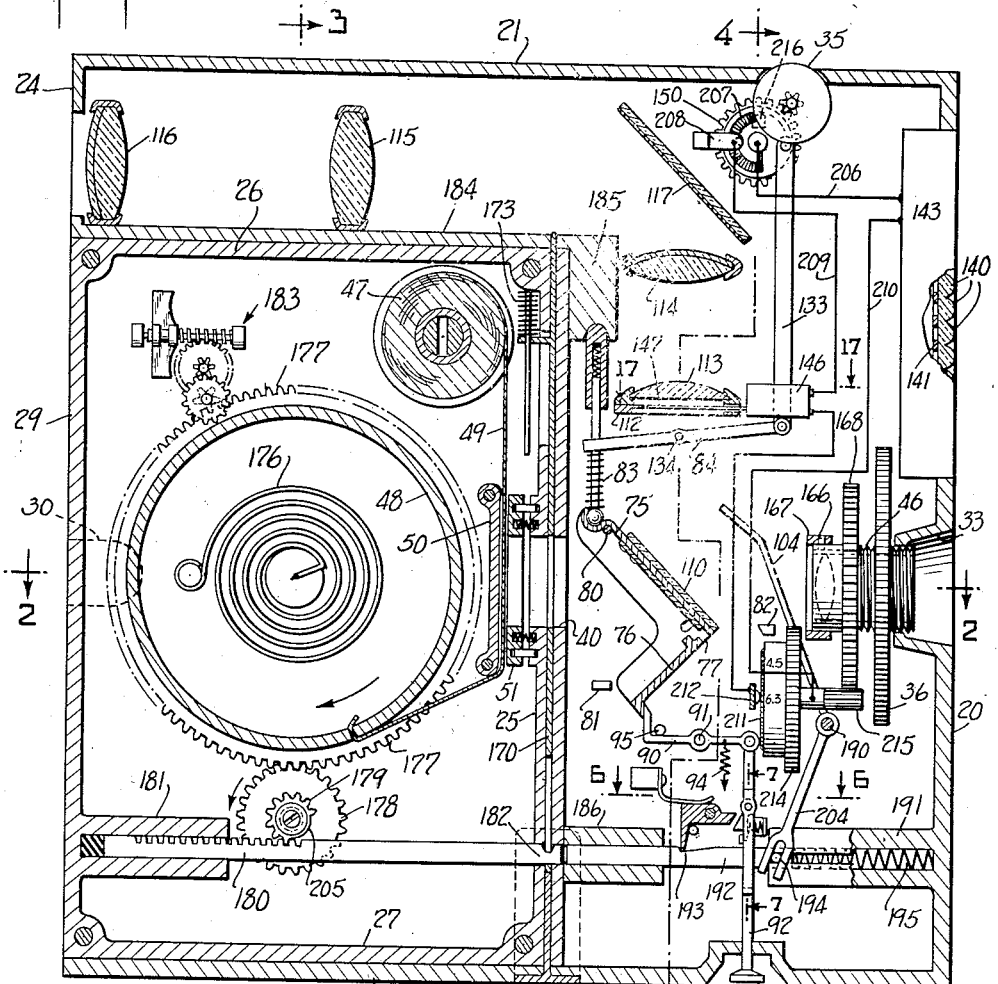
Figure 1 is a general cross-sectional elevation through a camera embodying the present improved features.

The camera illustrated herein is in most respects substantially the same as that illustrated and described in my aforementioned pending patent application. The camera body is preferably of substantially rectangular shape having the front wall 20, the top wall 21, the side walls 22, and a bottom wall 23. The rear wall 24 extends downwardly for only a short distance, thus leaving a rear rectangular opening for the reception of the film magazine or cassette. The camera body may thus be said to have a compartment into which the film cassette is removably insertable.

In the front wall 20 of the camera there is an opening 33 behind which the objective lens is mounted. Near the top there is a multiple window consisting of a series of minute convexities or lenses 140. This window is intended to receive and transmit a beam of light from the object which is to be photographed.

Accessible through the top wall 21 is a control wheel 35, or its equivalent, for regulating the effective shutter speed.

A control wheel 36 is mounted in screw-threaded relation on the lens assembly, and a portion of this wheel is accessible in at least one of the side walls 22, thus permitting exterior control of the movements of the objective lens for focusing purposes.

Accessible in the bottom wall 23 of the camera body is a button 93, or its equivalent, which controls the actuation of the shutter.

The functioning and purposes of these various control wheels and devices will become apparent in connection with the more detailed description of the several parts of the camera, which is to follow. It is to be understood that, in each case, unless otherwise specified, these details are given merely by way of example, and it will also be understood that the various elements entering into the present construction, including the various lenses, are all mounted and supported in any convenient manner by brackets and frames, and equivalent known structural elements, but may not be in each case specifically described. Also, where the present construction is substantially the same in nature, mode of operation, and function, as that which is illustrated and described in my aforementioned pending patent application, only a brief description will be given herein.

The objective lens

This lens (which may be a composite assembly of individual lenses, as is customary) is preferably mounted in a cylindrical sleeve 46 which is externally threaded and engaged by the control wheel 36. A pin 166, mounted in a fixed bracket 167, rides in a longitudinal groove in the sleeve 46, so that rotation of this sleeve is prevented when the wheel 36 is rotated. In this way, rotation of the wheel 36 advances and retracts the objective lens with respect to the opening 33, for focusing purposes.

In my aforementioned patent application, and also in the embodiment illustrated in Figure 13 of the present drawings, the objective lens has a fixed predetermined aperture. In the embodiment illustrated in Figure 1, and associated figures of the present drawings, a variable aperture or diaphragm is associated with the lens. This may be of any usual construction, and may be associated with the lens assembly in any desired usual manner. Its details are therefore not herein illustrated, and it will suffice to point out that a control wheel 168, concentric with the control wheel 36, is independently rotatable to vary the diaphragm opening or aperture.

The film magazine or cassette

Figure 20:
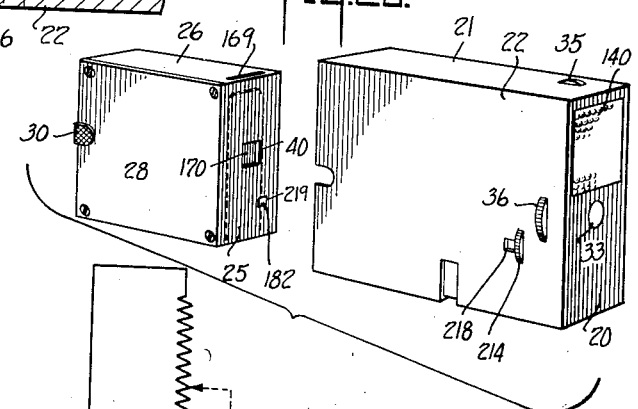
Figure 20 is a perspective view of the present camera body with the film cassette in spaced relationship.

Some of the novel features of the present invention relate to the structural nature, and mode of operation, of the film cassette. This cassette is shown by itself in Figures 11, 12 and 20, and certain details are shown most clearly in Figures 1, 2 and 3.

It will be understood that the camera is intended to be used with a film whose resolving power is comparable with that of the optical system. Such film is loaded into the cassette by the manufacturer or other professional service organization, thus assuring the use of the best and most proper kind of film, and its proper development and treatment after exposure. It is intended that the present film cassette be entirely self-contained and light-tight, capable of separate manufacture and handling, entirely independent of the camera body, so that it may be removably insertable, bodily, into the camera. This not only avoids all possibility of inadvertent exposure of the film during its loading and unloading with respect to the camera, but also obviates the necessity for cumbersome loading and unloading manipulations by the photographer, and thus contributes to the ease of use of the present camera.

Figure 2:
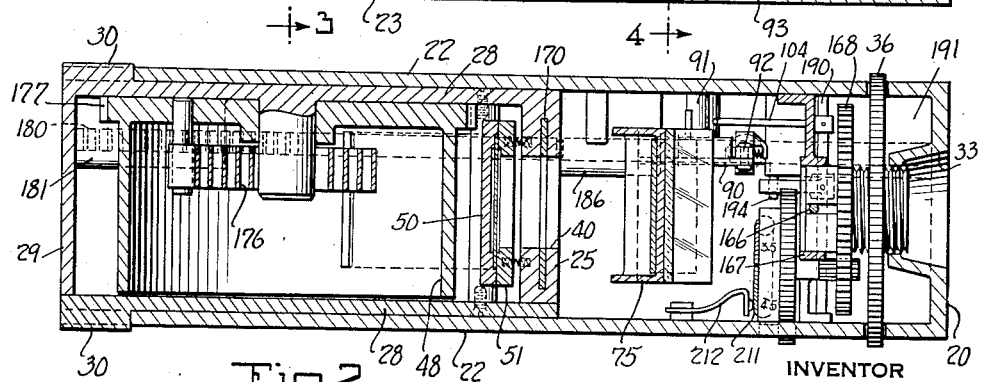
Figure 2 is a cross-sectional plan view taken substantially along the line 2—2 of Figure 1.

Like the camera body, the film cassette is preferably of rectangular shape having the front wall 25, the top wall 26, the bottom wall 27, side walls 28 (one of which is preferably removable), and a rear wall 29. This rear wall serves to complete the rear wall of the entire camera when the cassette is in position as shown in Figures 1 and 2.

The handling of the cassette is preferably accomplished by finger grips 30 which fit into corresponding recesses in the side walls 22 of the camera. When the cassette is inserted into the camera to the proper extent, and is in accurate predetermined position, it is locked into this position in the manner presently to be described.

In the front wall 25 of the film cassette I provide an opening 40, preferably square, through which may pass the image formed by the objective lens.

Extending longitudinally through the front wall 25 is a slot 169 within which a sliding shield 170 is mounted. This shield has an opening 171, substantially the same size and shape as the opening 40. It also is provided with an elongated opening 172. By means of a compression spring 173 bearing constantly upon a projection 174 carried by the shield 170, the latter is maintained normally in the position shown in Figures 11 and 12. In this position the end edge 175 of the shield is substantially flush with the bottom wall 27 of the cassette, while one end edge of the opening 172 (the upper edge of this opening as viewed in Figures 11 and 12) projects slightly across a transverse opening 219 in the wall 25. Also, the opening 40 is completely covered, the cassette being thus normally in a completely sealed light-tight condition.

Referring now more particularly to Figures 1 and 11, it will be observed that within the cassette is mounted the relatively small supply or feeding reel 47 and the relatively large take-up reel or drum 48. A length of film 49 travels from one reel to the other, and in doing so it passes in front of a guide plate 50, against which it is pressed by a guide plate 51 which is constantly under the urgence of springs 52 and under the guidance of pins 53. The element 51 is provided with an opening which is in alignment with the opening 40.

Also contained within the cassette is a motor for advancing the film from one reel to another. I have illustratively shown this motor in the form of a spring motor 176, which may be of any suitable construction, such as that used, for example, in phonographs. This motor is energized or wound up during the course of loading the cassette. It constantly tries to rotate the take-up reel 48 in the direction of the arrow shown in Figure 1. It is restrained however by virtue of the fact that the gear teeth 177 mounted on the take-up reel 48 mesh with the gear 178, the latter being mounted on the same shaft with a pinion 179 in engagement with the rack 180. This rack is mounted for reciprocal movement in a suitable guide 181. Its free end 182 projects through the transverse opening 219 in the wall 25, and is provided with a notch with which the shield 170 engages, as shown most clearly in Figure 11. More particularly, the upper end edge of the opening 172 is pressed down into the notch by means of the compression spring 173. The inability of the rack 180 to move toward the right (as viewed in Figure 1) prevents the spring motor 176 from rotating the take-up reel 48.

In order to limit the speed of action of the motor, when it is freed in the manner presently to be described, some sort of governor is preferably associated with it. By way of illustration I have shown a retarding device in Figure 1, designated generally by the reference numeral 183. This may be any conventional type of device, and I have shown the kind in which, by means of a gear chain constantly engaging with the gear teeth 177, a vaned device is rotated, at a rapid speed, the air resistance serving as the retarding influence.

It is to be observed that the shield 170, which may be of any suitable thin opaque material, is entirely independent of the film 49 and of the film guiding means. Accordingly, at no time does the film itself enter into the function of shielding those portions of it which are not in alignment with the opening 40. The film is thus subjected to no friction at all, at any time, except along its edges.

*Inserting the film cassette*

When the cassette is inserted into the camera, the side walls 28 fit snugly between the side walls 22 of the camera body, the bottom wall 27 rides over the bottom wall 23 of the camera body, and the top wall 26 slides beneath the interior wall 184 mounted within the camera body. The inward movement of the cassette is limited by the abutment wall 185 and the bracket or bearing 186, and when the cassette is properly positioned, the film 49 is exactly the correct predetermined distance from the objective lens of the camera, and the opening 40 is accurately in alignment with the principal axis of the camera lens.

It is locked in this position by the application of a clip or device of the character shown in Figure 5. This device consists of a U-shaped strip, preferably of metal, having the base 187 and the side arms 188. Carried by the base 187 is the rigid tongue 189. The tongue is inserted upwardly through a suitable slit in the bottom wall 23 of the camera body, and the arms 188 frictionally engage the opposite side walls 22 of the camera body, preferably fitting into shallow recesses provided for this purpose. The slit in the camera body is accurately in alignment with the slit 169 in the film cassette. Accordingly, the tongue 189 presses upwardly against the edge 175 of the shield 170 and presses this shield into the position of Figure 1, against the action of the spring 173. This does various things. In the first place, the upper edge of the shield 170 projects upwardly through a slit in the interior partition 184, thus locking the film cassette firmly in proper position within the camera body. In the second place, the opening 171 aligns itself with the opening 40, thus uncovering the latter. In the third place, the notch in the rack 180 is released, thus freeing the rack from restraint by means of the shield 170.

It may be pointed out that the withdrawal of the cassette from the camera is effected by a reverse procedure. The mere removal of the device of Figure 5 allows the shield 170 to return to its normal position, and the cassette is then readily removable as a complete self-contained light-tight unit.

*The shutter*

The shutter and the parts associated with it are substantially as shown and described in my aforementioned patent application. Briefly, the preferred construction comprises the two angularly related opaque wall portions 75 and 76 with a slit 77 arranged between their adjacent edges. The shutter is adapted to pivot around the pin 80 between the starting position shown in Figures 1 and 10, and the end position shown in Figure 9. Movement in one direction is preferably limited by the stop or abutment 81, and movement in the other direction may be conveniently limited by the stop or abutment 82.

The shutter operates under the action of a compression spring 83 which presses at the top against one end of the lever 84.

Under normal conditions, the shutter is held in the starting position by the free end of the lever 90 which rocks on the fixed pivot 91 and is articulated at its other end to the rod 92 extending down through the bottom wall 23 of the camera and terminating in the button 93. A spring 94, and a stop pin 95, hold the lever 90 in its normal position.

When the shutter is to be actuated, pressure upon the button 93 allows the spring 83 to swing the shutter into the position shown in Figure 9. The restoration of the shutter to its starting position is accomplished by the arm 104, which is normally in the position shown in Figures 1 and 9, and which is adapted to move into the position of Figure 10 (pivoting at 190) during the restoration of the shutter.

The shutter details, its mode of operation, and its mode of restoration, are more fully illustrated and described in my aforementioned patent application.

*Automatic film advancement*

Reference is now directed to Figures 1, 6, 7, 8, 9, and 10. Mounted in the bearing 186, in alignment with the rack 180, and extending into the aligned bearing 191, is the rod 192. It is provided with a notch 193, and with a laterally projecting pin 194 adapted to move in a slot in the bearing 191. A normally-untensioned compression spring 195, weaker than the film motor, bears against the rod 192 at the right (as viewed in Figures 1, 9, and 10). Movement toward the right is positively prevented, under normal conditions, by means of the finger 196 (Figure 8) engaging within the notch 193. This finger is pivoted at 197. A spring 198 constantly urges this finger into the full-line position of Figure 8, at which time it rests against the stop pin 199. Movement is however permitted into the dot-and-dash position of Figure 8.

The rod 92 has a forked portion (see Figure 7) which permits passage through it of the rod 192. Pivoted in this forked portion is the latch 200. It is pivoted as at 201, and is constantly urged against the abutment 202 by the compression spring 203.

When the button 93 is pressed upwardly, the latch 200 yields as it brushes past the rear end of the finger lever 196. On the return movement of the rod 92, however, under the action of the spring 94, the latch 200 forces the finger lever 196 into the dot-and-dash position of Figure 8. The rod 192 being thus released, it is free to move under the impulse of the rack 180, as indicated in Figure 10. During this movement, the spring 195 becomes compressed, the pin 194 (through the intermediary of the forked arm 204) actuates the shutter-restoring arm 104, and the take-up reel 48 rotates to advance the film.

It will be observed, however, that the pinion 179 has a toothless or mutilated portion 205. By virtue of this toothless portion, engagement between the pinion 179 and the rack 180 is presently destroyed. This permits the spring 195 to function, as a result of which the rod 192 and the rack 180 are forced back into the position of Figure 9. The finger 196, under the urgence of the spring 198, snaps back into the full line position of Figure 8, and thus again locks the rod 192 against movement. This in turn again restrains the driving motor 176.

The rack 180 has a constant throw or movement, which is just sufficient to allow the motor 176 to move the next adjacent unused portion of the film 49 into receptive positions in alignment with the opening 40. As pointed out in my pending application, the arc through which the reel 48 is thus advanced, in stepwise manner, is preferably selected so that it is unevenly divisible into 360°. This is desirable, because of the relatively large diameter of the reel 48, as pointed out in said pending patent application, and it will be understood that in the present camera, markings on the reel 48, adapted to show through suitable sight openings, are intended to be provided, although they are not shown in detail in the present drawings.

The optical viewing system

This system is substantially the same as that which is shown and described in my pending patent application. Briefly, before the shutter is actuated, the rays of light entering through the objective lens are reflected, as at 110, to produce an aerial image substantially in the plane of a frame 112 whose opening is identical in shape and size with the shape and size of the film portion ultimately to be exposed. By means of suitable lenses 113-116, constituting a sort of telescope, whose axis turns through 90° by virtue of a reflector 117, an observer is enabled to obtain a magnified view of the aerial image. He thus sees exactly what the lens of the camera "sees," and by manipulation of the wheel 36 he is enabled to bring the image accurately into focus, and also accurately to frame the picture he intends to take.

The frame 112 is so positioned with respect to the camera lens that the plane in which the aerial image is formed is exactly the same optical distance from the camera lens as the film 49, when the cassette is properly locked in the camera body. Accordingly, when the aerial image is in focus, the image that will be thrown onto the film, when the picture is taken, will also be in focus.

Regulation of effective shutter speed

Figure 16:
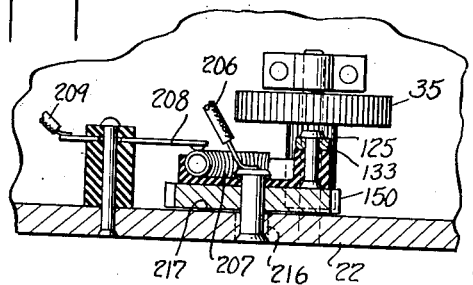
Figure 16 is a cross-sectional view taken substantially along the line 16—16 of Figure 15.

One way of varying the effective shutter speed is by varying the tension of the spring 83 and I have chosen to illustrate such an arrangement in the present drawings. It will be understood, however, that the effective shutter speed may be varied in other ways, for example, in the manner shown in Figures 16 and 17 of my pending patent application.

The spring 83 is normally tensioned, so that the shutter is always in readiness for the taking of a picture. This tension is subject to adjustment, however, by up and down movements of a link 133, the lower end of which is pivotally articulated to the end of the lever 84 opposite to the end which presses upon the spring 83, the lever 84 being mounted for rocking movement around the pivot 134. The upper end of the link 133 is pivotally secured to a gear 150 meshing with a pinion 125, the latter being coaxially mounted with respect to the wheel 35. Rotation of the wheel 35 thus controls the tension of the shutter spring 83. For example, if it is rotated clockwise, as viewed in Figure 1, it lifts the link 133 and increases the tension of the spring 83. If it is moved counterclockwise, it relaxes the tension of the spring 83.

Shutter spring release

This construction affords a convenient means for relaxing the tension of the shutter spring 83, almost completely, during relatively prolonged periods when the camera may not be in use. This would be accomplished by rotating the wheel 35 in a counterclockwise direction, as viewed in Figure 1. With this purpose in view, an opening 216 is provided in the side wall of the camera body, and a suitable marking 217 is provided on the outer face of the gear 150, so positioned that it will show through the opening 216 when the shutter spring 83 is relaxed to the maximum allowable degree.

This relaxing of the spring, however, does not in the least affect the automatic quality of the camera, since the latter continues to be in complete readiness for the taking of a picture, during which time the operator will, in any event, be rotating the wheel 35 pursuant to the image that he is viewing.

The electric circuit

The composite window, made up of the multiple lenses 140, is substantially the same as that which is described and illustrated in my pending application. Each of the lenses 140, in conjunction with a suitably constructed mask 141, is so designed that the field of view of the composite window is exactly the same (except for parallax) as the restricted field of view which is imposed upon the film.

Behind the window is a photo-electric cell 143 which is not illustrated in detail, since such a cell is well known per se. By means of an electric circuit, most clearly illustrated in Figures 18 and 19, the cell 143 is connected with a device 146, which is an electric meter, known per se, which controls the movements of a movable pointer 147. This pointer moves by varying amounts, in proportion to the intensity of the light acting on the photo-electric cell 143.

Figure 17:
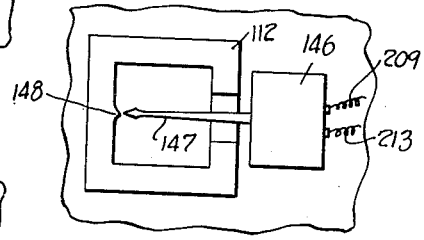
Figure 17 is a plan view taken substantially along the line 17—17 of Figure 1.

The pointer 147 is arranged to form part of the image that is produced by the objective lens and viewed by the operator. Preferably, the pointer 147 is arranged in alignment with or closely adjacent to the plane in which the aerial image is produced, as indicated in Figure 17. In this figure I have shown the preferred mode of providing the frame 112 with a fixed marker 148 having a predetermined positional relation to the pointer 147 when the settings of the camera (effective shutter speed and lens aperture) are most advantageous with respect to the quality of the light emanating from the subject.

In the electric circuit connecting the photo-electric cell and the device 146, there is a variable impedance, which I have shown in the form of a variable resistance. This variable impedance has two parts. Thus, referring to Figures 18 and 19, it will be observed that a lead wire 206 extends to one end of a resistance 207, this resistance being relatively movable with respect to a contact 208 connected, as at 209, with the device 146. Another lead wire 210 extends from the cell 143 to one end of a resistance 211 which is relatively movable with respect to a contact 212 connected, as at 213, with the device 146.

Figure 15:
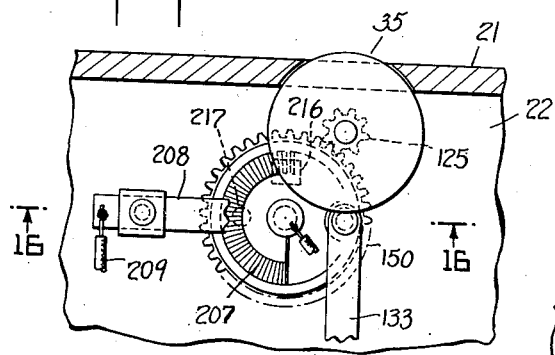
Figure 15 is an enlarged fragmentary view of the upper right hand portion of Figure 1.

There are various ways of introducing these variable resistances into the camera assembly. By way of example, I have mounted the resistance 207, in the form of a spiral coil, on the gear 159 in concentric relation to the latter. This is shown most clearly in Figure 1, and in Figures 15 and 16. Rotation of the wheel 35 thus serves to introduce more or less of the resistance 207 into the electric circuit.

Similarly, I have shown the resistance 211 in the form of a coiled spiral mounted concentrically on the wheel 214 shown most clearly in Figures 1, 13 and 14. In the embodiment of Figure 1, the wheel 214 is coaxially mounted with respect to a pinion 215 which meshes with suitable teeth on the wheel 168. On the other hand, this is not an absolutely essential interrelationship of parts, and in the embodiment of Figure 13, the wheel 214 is entirely independent. (Although Figure 14 is based on Figure 13, it serves equally well to depict the wheel 214 shown in Figure 1.) In either case, a portion of the wheel 214 projects out through the wall of the camera, as shown most clearly in Figure 20, so that this wheel is accessible from the exterior. Rotation of this wheel introduces more or less of the resistance 211 into the electric circuit.

*Mode of operation*

It will be observed that the photo-electric cell serves as a means, responsive to the beam of light transmitted by the composite window 140, for controlling the movements of the pointer 147.

It will also be observed that each of the wheels 35 and 214 serves as an independent means, i. e., independent of the photo-electric device, for varying the position of the pointer.

Let it be assumed that the wheel 214 is set in a position which introduces a proper predetermined portion of the resistance 211 into the electric circuit, with respect to the particular lens that is employed at the moment. Let it also be assumed that alignment of the pointer 147 with the fixed marker 148 is the desired positional relationship of these parts for optimum results in taking a picture.

When the camera is then aimed at a subject, the pointer 147 will assume a position depending upon the amount of light emanating from the subject. The chances are that the pointer will not accurately align itself with the fixed marker 148. The operator brings the pointer to this position, however, by manipulating the wheel 35. This serves to introduce or remove some of the resistance 207, which in turn varies the position of the pointer. When the pointer is in alignment with the fixed marker 148, the effective shutter speed is automatically set to the correct amount.

Figure 18:
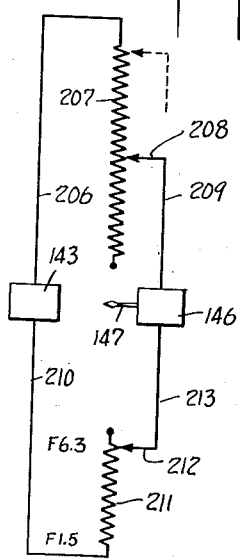
Figure 18 is a diagrammatic view of the electric circuit with the parts in one illustrative adjustment.

For illustration, to bring the pointer to the proper position, using a lens of, say, aperture F6.3, the operator may have to bring the contact 208 to, let us say, the full-line position of Figure 18 on a relatively bright day, and will have to bring the contact to about the dotted position of Figure 18 on a relatively dull day. The positions shown in Figure 18 are purely illustrative, but serve to indicate that on a relatively dull day less of the resistance 207 will be in the electric circuit. This resistance is so mounted on the gear 159 that under these circumstances the spring 83 is tensioned to a minimum degree, and the effective shutter speed is thus relatively small, i. e., the exposure time is relatively long; whereas, on a relatively bright day, more of the resistance 207 is in the electric circuit, and the effective shutter speed is increased by a corresponding greater tension of the spring 83.

Figure 19:
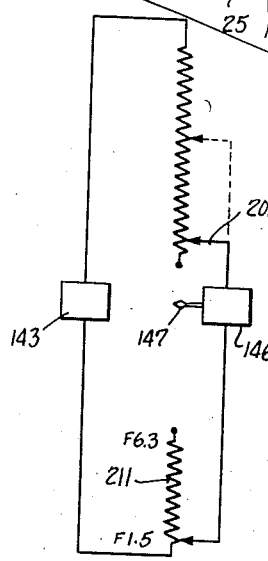
Figure 19 is a view similar to Figure 18 with the parts in another illustrative adjustment.

Under the same light conditions, but using a lens of larger aperture, it is obvious that the adjustments of the wheel 35 would have to be correspondingly different. That is, the effective shutter speed would have to be faster (shorter exposure time) in each case. This is taken care of by the resistance 211. For illustration, where a lens of, say, aperture F1.5 is used, all or most of the resistance 211 would be withdrawn from the electric circuit, as shown in Figure 19. Under these circumstances, the operator's desire to bring the pointer 147 into alignment with the marker 148 would require that, on a relatively bright day, the contact 208 be brought to about the full-line position of Figure 19; whereas, on a relatively dull day, it would have to be brought somewhere in the neighborhood of the dotted position of Figure 19.

The resistance 211, in effect, shifts the range of movement of the pointer 147. Assuming, for example, that in Figure 17, the pointer moves in a clockwise direction as light intensity increases, it will move further with the resistance 211 out of the circuit (Figure 19) than it would with some or all of the resistance 211 in the circuit (Figure 18), under the same light conditions.

To harness these effects to practical purposes in the present camera, I prefer to calibrate the wheel 214 in terms of various lens apertures. I have indicated this in Figures 1 and 12, in which suitable markings appear successively on the periphery of one portion of the wheel 214. These markings will show through a suitable window 213 in the camera body.

Where, as in Figure 1, the aperture-varier 168 is mechanically interconnected with the wheel 214, an adjustment of the wheel 214 serves automatically to vary the aperture of the lens and to insert the proper predetermined amount of resistance 211 into the circuit. Where, as in Figure 13, there is no such mechanical relationship of parts, the variation in the lens aperture (either by an independent aperture-varier or by replacement of the entire lens) must be accompanied by a separate manipulation of the wheel 214 in order to bring the corresponding indication to view through the window 218.

There are two ways in which the arrangement can be used, in practice. Usually, and preferably, the photographer decides to take a certain picture with a particular aperture. If the camera is constructed as in Figure 13, he sees to it that a lens having the desired aperture is in the camera, and he then adjusts the wheel 214 until the corresponding marker shows through the window 218. Or, if the camera is constructed as in Figure 1, he adjusts the wheel 214 until the desired marker shows through the window 218, and the desired lens aperture is thus automatically provided for. He then frames the subject of the picture, and adjusts the wheel 35 until the pointer 147 is in the desired positional relation to the fixed marker 148. The effective shutter speed will then have been automatically regulated to the proper amount.

On the other hand, the operator may prefer to take a given picture at a certain selected effective shutter speed, in which case he would first set the wheel 35 (suitably calibrated in terms of various effective shutter speeds). He then frames the subject and manipulates the wheel 214 until the pointer 147 is in the desired positional relation to the fixed marker 148. The indication showing through the window 218 then tells him what lens aperture he should use. If the parts are constructed as in Figure 1, this lens aperture will automatically be brought into operation.

It will be understood that the resistances 207 and 211 are so constructed and mounted that the variations effected by the wheels 35 and 214 will bring about the desired corresponding effects with respect to aperture opening and effective shutter speed.

It will also be understood that, if desired, the frame 112 may be marked or calibrated so that the operator may, if he chooses, take a picture of deliberately under-exposed or over-exposed character, these markings serving to aid his judgment.

In general, it will be understood that changes in the details herein described and illustrated for the purpose of explaining the nature of my invention may be made by those skilled in the art without departing from the spirit and scope of the invention as expressed in the appended claims. It is, therefore, intended that these details be interpreted as illustrative, and not in a limiting sense.

Having thus described my invention, what I claim as new and desire to secure by Letters Patent is—

1. In a camera, a compartment adapted to receive a film cassette, a self-contained light-tight film cassette adapted to be removably inserted into said compartment; said cassette comprising within itself a supply reel, a take-up reel, a spring motor for advancing a film from one reel to the other, and means normally restraining said motor; means for removably securing said cassette within said compartment, and means controlled by said securing means for freeing said motor after the cassette is inserted into the camera.

2. In a camera, a compartment adapted to receive a film cassette, a self-contained light-tight film cassette adapted to be removably inserted into said compartment and provided with an opening adapted to align with the camera axis; said cassette comprising within itself a supply reel, a take-up reel, a spring motor for advancing a film from one reel to the other, a movable shield normally covering said opening, and means controlled by said shield for normally restraining said motor; and means for moving said shield to uncover said opening and for freeing said motor after the cassette is inserted into the camera.

3. In a camera, a compartment adapted to receive a film cassette, a shutter actuator, a film cassette adapted to be removably inserted into said compartment and provided with an opening adapted to align with the camera axis, said cassette comprising within itself a supply reel, a take-up reel, and a spring motor for advancing a film from one reel to the other, a movable shield normally covering said opening, means controlled by said shield for normally restraining said motor, means operable from the exterior of the camera only after the cassette has been properly and accurately inserted into said compartment for moving said shield to uncover said opening and free the motor, means for releasably restraining said motor after it has been freed by said movement of said shield, and means controlled by the shutter actuator for releasing said last-named restraining means so as to free the motor to allow film advancement.

4. In a camera, the combination with the elements set forth in claim 3, of means operable upon film-advancement for rendering said last-named restraining means operative again.

5. In a camera, the combination of elements set forth in claim 3, said last-named restraining means comprising a pinion driven by said motor, a toothed member meshing with said pinion, and a releasable latch locking said toothed member against movement.

6. In a camera, a compartment adapted to receive a film cassette, a shutter actuator, a film cassette adapted to be removably inserted into said compartment and provided with an opening adapted to align with the camera axis, said cassette comprising within itself a supply reel, a take-up reel, and a spring motor for advancing a film from one reel to the other, a movable shield normally covering said opening, means controlled by said shield for normally restraining said motor, means operable from the exterior of the camera only after the cassette has been properly and accurately inserted into said compartment for moving said shield to uncover said opening and free the motor, means for releasably restraining said motor after it has been freed by said movement of said shield, said restraining means comprising a pinion driven by said motor, a toothed member meshing with said pinion, and a releasable latch locking said toothed member against movement, and means controlled by the shutter actuator for releasing said latch so as to free the motor to allow film advancement.

7. In a camera, the combination with the elements set forth in claim 6, of restoring means operable upon film advancement for rendering said last-named restraining means operative again.

8. In a camera, the combination with the elements set forth in claim 6, of restoring means operable upon film advancement for rendering said last-named restraining means operative again, said pinion having a toothless portion, and said restoring means being adapted to reset the toothed member into latched position when the pinion disengages said member by virtue of said toothless portion.

9. In a camera, a compartment adapted to receive a film cassette, a spring-controlled shutter adapted to move out of a set position when the shutter is actuated, a shutter actuator, a film cassette adapted to be removably inserted into said compartment and provided with an opening adapted to align with the camera axis, said cassette comprising within itself a supply reel, a take-up reel, and a spring motor for advancing a film from one reel to the other, a movable shield normally covering said opening, means operable from the exterior of the camera only after the cassette has been properly and accurately inserted into said compartment for moving said shield to uncover said opening and free the motor, means for releasably restraining said motor after it has been freed by said movement of said shield, means controlled by the shutter actuator for releasing said last-named restraining means so as to free the motor to allow film advancement, and means operable upon film advancement for resetting the shutter and for rendering said last-named restraining means operative again.

10. In a camera construction, a camera including a shutter, means for operating the shutter to open the same, means for resetting said shutter and a compartment for receiving a removable cassette, said cassette having an opening at one side thereof through which a frame of a strip of film may be exposed, said opening being so positioned that when said cassette is in said compartment the opening of said shutter will expose said cassette opening and film, a supply reel for a roll of film within said cassette, a take-up reel for a roll of film within said cassette, a spring motor for advancing the film from one reel to the other within said cassette, control means within said cassette to control said motor to prevent movement thereof and allow movement thereof upon actuation to advance the film a single frame, means to connect said means for operating said shutter and said means for resetting said shutter with said spring motor control means when said cassette is positioned within said camera so that each operation of said shutter will release said spring motor to advance said film a single frame, means within said cassette to lock said controlling means to prevent movement of said spring motor when said cassette is outside said camera, and movable shield normally covering said opening in said cassette when the cassette is not in the camera, said shield being provided with means to remove it from said opening when said cassette has been properly and accurately positioned in said compartment.

11. In a camera construction, a camera including a shutter, means for operating the shutter to open the same, means for resetting said shutter and a compartment for receiving a removable cassette, said cassette having an opening at one side thereof through which a frame of a strip of film may be exposed, said opening being so positioned that when said cassette is in said compartment the opening of said shutter will expose said cassette opening and film, a supply reel for a roll of film within said cassette, a take-up reel for a roll of film within said cassette, a spring motor for advancing the film from one reel to the other within said cassette, control means within said cassette to control said motor to prevent movement thereof and allow movement thereof upon actuation to advance the film a single frame, means to connect said means for operating said shutter and said means for resetting said shutter with said spring motor control means when said cassette is positioned within said camera so that each operation of said shutter will release said spring motor to advance said film a single frame, said last-mentioned means including cooperating reciprocatory elements in the cassette and the camera, means within said cassette to lock said controlling means to prevent movement of said spring motor when said cassette is outside said camera, and movable shield normally covering said opening in said cassette when the cassette is not in the camera, said shield being provided with means to remove it from said opening when said cassette has been properly and accurately positioned in said compartment.

ALVIN H. COHEN.